US006989088B2

(12) United States Patent
Kanno et al.

(10) Patent No.: US 6,989,088 B2
(45) Date of Patent: Jan. 24, 2006

(54) PERFLUOROCYCLICAMINE, CONSTANT BOILING COMPOSITION AND PROCESS FOR PRODUCING THE SAME

(75) Inventors: Kiyomitsu Kanno, Kanagawa (JP); Toshio Nagashima, Kanagawa (JP); Galina I. Kaourova, St. Petersburg (RU); Dmitri D. Moldavski, St. Petersburg (RU); Vladimir I. Gribel, St. Petersburg (RU)

(73) Assignee: Showa Denko Kabushiki Kaisha, Tokyo (JP)

( * ) Notice: Subject to any disclaimer, the term of this patent is extended or adjusted under 35 U.S.C. 154(b) by 379 days.

(21) Appl. No.: 10/434,121

(22) Filed: May 9, 2003

(65) Prior Publication Data

US 2003/0199409 A1     Oct. 23, 2003

Related U.S. Application Data

(62) Division of application No. 09/924,558, filed on Aug. 9, 2001, now Pat. No. 6,602,844.

(60) Provisional application No. 60/241,741, filed on Oct. 20, 2000.

(30) Foreign Application Priority Data

Aug. 11, 2000 (JP) .......................... P2000-243518

Oct. 11, 2000 (JP) .......................... P2000-311058

(51) Int. Cl.
*C11D 7/50* (2006.01)
*C09K 13/00* (2006.01)

(52) U.S. Cl. ...................... 205/430; 205/460; 514/429; 546/192; 510/408; 510/412; 548/400

(58) Field of Classification Search ................ 205/430, 205/460; 514/429; 546/192; 510/408, 412; 548/400
See application file for complete search history.

(56) References Cited

U.S. PATENT DOCUMENTS

| | | | | |
|---|---|---|---|---|
| 4,024,192 A | * | 5/1977 | Benninger et al. | 568/669 |
| 4,534,978 A | * | 8/1985 | Yokoyama et al. | 514/429 |
| 5,104,034 A | * | 4/1992 | Hansen et al. | 228/234.2 |
| 5,962,385 A | | 10/1999 | Maruyama et al. | |
| 6,602,844 B2 | * | 8/2003 | Kanno et al. | 510/412 |
| 6,878,826 B2 | * | 4/2005 | Gervits et al. | 546/192 |

* cited by examiner

*Primary Examiner*—Gregory Webb
(74) *Attorney, Agent, or Firm*—Sughrue Mion, PLLC

(57) ABSTRACT

A process for producing a perfluorocyclicamine which includes electrolytically fluorinating a triallylamine in anhydrous liquid hydrogen fluoride. A constant boiling composition and process for producing the same is also described.

4 Claims, No Drawings

PERFLUOROCYCLICAMINE, CONSTANT BOILING COMPOSITION AND PROCESS FOR PRODUCING THE SAME

CROSS REFERENCE TO RELATED APPLICATIONS

This is a divisional of application Ser. No. 09/924,558 filed Aug. 9, 2001 now U.S. Pat. No. 6,602,844, which claims benefit of Provisional Application No. 60/241,741 filed Oct. 20, 2000; the above noted prior applications are all hereby incorporated by reference.

FIELD OF THE INVENTION

The present invention relates to a novel compound perfluoro-1-propyl-3,4-dimethylpyrrolidine, a constant boiling composition containing the compound, a process for producing the composition, and uses of the constant boiling composition.

BACKGROUND OF THE INVENTION

In the process of manufacturing a semiconductor device, liquid perfluorocarbons (hereinafter referred to as "PFCs") having an excellent electric insulating property have been heretofore widely used as the heat medium for controlling the wafer temperature within a chamber in an etching process using a high-voltage plasma or for maintaining a high temperature or a low temperature in the thermal shock test of a wafer or in the performance inspection of the wafer.

Recently, a problem of global warming has been raised and based on the protocol adopted at the Kyoto conference in 1997, Japan has also started to establish goals for reducing the discharge of six kinds of gases including PFCs and to take a specific action.

PFCs are very stable (inactive), both thermally and chemically, and are not considered to deplete the ozone layer because the ozone depleting potential (ODP) thereof is zero due to the absence of chlorine atom in the molecule. Moreover, PFCs are low toxic and noncombustible. By virtue of these excellent properties, they have been widely used, particularly, in the field of manufacture of semiconductor devices where corrosion resistance, insulating resistance and the like are required. Representative examples of liquid PFCs include $C_5F_{12}$, $C_6F_{14}$ and $C_8F_{18}$. These PFCs are, however, known to have a great effect on warming because of their very high stability and the global warming potential (GWP) thereof are as high as 5,000 to 7,000 (integral term: 100 years, assuming that $CO_2$ is 1).

In the case of using these PFCs as the above-described heat medium in an open system or even in a closed system, since complete enclosure is difficult in view of the apparatus design or structure, the system is substantially opened to atmospheric conditions in many cases. Therefore, particularly when the temperature is close to the boiling point of the substance used, the substance inevitably volatilizes into the atmosphere in a large amount. This not only increases the cost necessary for adding and replenishing the heat medium but also raises a serious problem in view of the discharge of a warming gas.

Hydrofluoroethers (hereinafter referred to as "HFEs") and hydrofluorocarbons (hereinafter referred to as "HFCs), which are considered to have a small effect on warming, have been developed as alternatives of PFCs. A representative example of HFEs is $C_4F_9OC_2H_5$ and a representative example of HFCs is cyclic $C_5H_2F_8$. However, these substances are relatively low in boiling point (max.: about 80° C.), and therefore, they cannot be used at high temperatures which reaches 100° C., and the electric properties thereof are inferior to conventional PFCs. Because of these reasons, their use in the field of manufacturing of semiconductor devices is limited and these substances are mainly used as a cleaning agent or a solvent.

In the process of manufacturing a semiconductor device, the use form of the heat medium is classified into indirect heat transfer and direct heat transfer. Indirect heat transfer is where the heat medium itself circulates through a heat transfer path (e.g., heat exchanger) and repeats heat absorption or heat release. Direct heat transfer is where the temperature of a material body is changed or maintained while allowing the heat medium to stand in the state of directly contacting with the material body, for example, by dipping the material body directly in the heat medium. In either case, a wide temperature region from an extremely low temperature of about –50° C. to a high temperature of 100° C. must be continuously or intermittently covered. Therefore, there is a demand for a system of operating the transfer of heat by one kind of heat medium. For example, in the case of a substance which does not boil in a high temperature region (that is, a substance having a high boiling point of at least 100° C. or more), the substance is required to have properties of maintaining the liquid phase even in an extremely low temperature region of –50° C., which is included in the temperature range during use, and required to have appropriate flowing properties at the same time. For this purpose, the freezing point or the temperature where the substance starts flowing (pour point) is preferably lower than the lowest temperature on use.

In recent years, studies have been made on extremely low temperature conditions on the level of –70° C. and therefore, the substance must have the required properties at low temperatures. On the other hand, from the standpoint of coping with the warming problem, the substance must be reduced in volatilization loss by having the required properties at high temperatures. Accordingly, in practice, the range from the freezing point to the boiling point of the heat medium is preferably the temperature range ±30° C. during use, namely, approximately from –100 to 130° C. The existing HFEs and HFCs are known to have a relatively low freezing point but are inferior to PFCs in the electrical properties such as dielectric breakdown voltage and volume resistivity. On the other hand, PFCs are excellent in these electrical properties but those having a low freezing point are liable to have a small molecular weight and a low boiling point. As such, when conventional HFEs, HFCs and PFCs are used as a sole compound, they cannot be a preferred heat medium that is well-balanced in physical properties by practically having a broad temperature range in terms of the temperature range from the freezing point to the boiling point and having good electrical properties at the same time.

Therefore, for example, a method of mixing specific components to provide an azeotropic composition or an azeotrope-like composition to obtain a constant boiling mixture, or a method of adjusting the mixing ratio according to the use conditions to control the properties of the mixture may be developed. However, for using the heat medium in such a system, the constant boiling composition is indispensable, but the combination of existing HFEs, HFCs and PFCs cannot form an azeotropic composition. Moreover, the method of adjusting the mixing ratio highly probably incurs changes in the composition and this is disadvantageous in practice.

The present invention has been made under these circumstances. An object of the present invention is to provide a heat medium, which can contribute to the reduction in the discharge of warming gas by having high boiling properties, can maintain the liquid phase in a wide temperature range during use by having a low freezing point and, at the same time, is favored with excellent electrical insulating properties.

As a result of extensive investigations to solve the above-described problems, the present inventors have found that a constant boiling composition comprising perfluoro-1-propyl-3,4-dimethylpyrrolidine, perfluoro-1-propyl-3-methylpiperidine and perfluorotripropylamine exhibits excellent properties as a heat medium in the process of manufacturing a semiconductor device. Furthermore, extensive investigations have been made on the process for producing the composition. As a result, the present inventors have found that the constant boiling composition can be easily synthesized by using a triallylamine having high general use property and electrolytically fluorinating it in an anhydrous liquid hydrogen fluoride. The present invention has been accomplished based on these findings.

SUMMARY OF THE INVENTION

An embodiment of the present invention (I) is a process for producing a perfluorocyclicamine, comprising electrolytically fluorinating a triallylamine in an anhydrous liquid hydrogen fluoride to produce a perfluorocyclicamine represented by the following formula (1):

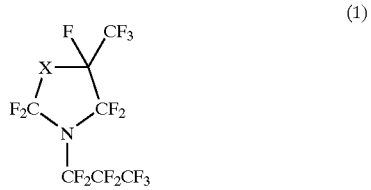

(1)

wherein —X— represents —CF($CF_3$)— or —$CF_2CF_2$—. In a preferred embodiment, the concentration of triallylamine in the anhydrous liquid hydrogen fluoride is in the range from 1 to 20% by mass and the current density is in the range from 0.1 to 10 A/$dm^2$.

Another embodiment of the present invention (II) is perfluoro-1-propyl-3,4-dimethylpyrrolidine which is a novel compound and which is a compound represented by the formula (1) where —X— is —CF($CF_3$)—.

Another embodiment of the present invention (III) is a process for producing a constant boiling composition comprising cis-perfluoro-1-propyl-3,4-dimethylpyrrolidine, trans-perfluoro-1-propyl-3,4-dimethylpyrrolidine, perfluoro-1-propyl-3-methylpiperidine and perfluorotripropylamine, the process comprising electrolytically fluorinating a triallylamine in an anhydrous liquid hydrogen fluoride. In a preferred embodiment, the concentration of triallylamine in an anhydrous liquid hydrogen fluoride is in the range from 1 to 20% by mass and the current density is in the range from 0.1 to 10 A/$dm^2$.

Another embodiment of the present invention (IV) is a constant boiling composition comprising cis-perfluoro-1-propyl-3,4-dimethylpyrrolidine, trans-perfluoro-1-propyl-3,4-dimethylpyrrolidine, perfluoro-1-propyl-3-methylpiperidine and perfluorotripropylamine. In a preferred embodiment, the content of perfluorotripropylamine is 55% or less, the boiling point is from 127 to 129° C., and the freezing point is −100° C. or less.

Other embodiments of the present inventions (V) and (VI) are an electrical insulator using the constant boiling composition of the embodiment of the present invention (IV) and a heat medium using the constant boiling composition of the embodiment of the present invention (IV).

DETAILED DESCRIPTION OF THE INVENTION

The present invention is described in detail below. With respect to the process for producing perfluoro-tertiary amine, U.S. Pat. No. 2,519,983 (Simons), U.S. Pat. No. 2,567,011 (Simons et al.) and U.S. Pat. No. 2,616,927 (Kauck) describe a process of electrolytically fluorinating a triethylamine in an anhydrous liquid hydrogen fluoride to produce a perfluorotriethylamine. Furthermore, L. Conte et al. report in *J. Fluorine Chem.*, 30, 89 (1985) a process of electrolytically fluorinating a tripropylamine as an alkyl tertiary amine, similarly, in an anhydrous liquid hydrogen fluoride to produce a perfluorotripropylamine (hereinafter referred to as "PFTPA"). As such, the perfluoro-tertiary amine has been heretofore produced from a corresponding alkyl tertiary amine.

With respect to the process for producing a perfluorocyclicamine, E. Hayashi et al. report in *J. Fluorine Chem.*, 26, 417 (1984) that when a pipecoline such as N-(3-chloropropyl)-3-pipecoline is electrolytically fluorinated in an anhydrous liquid hydrogen fluoride, a plurality of perfluoropyrrolidine isomers are present in the electrolytic fluorination product.

As such, the process for producing a perfluoroalkyl tertiary amine from a corresponding alkyl tertiary amine by the electrolytic fluorination is known. Also, for obtaining a cyclic amine, a process of producing a perfluorocyclicamine starting from a compound having the objective cyclic structure through electrolytic fluorination is known. However, the process of electrolytically fluorinating a triallylamine which is a tertiary amine having an unsaturated alkyl group, to produce a perfluorocyclicamine of the present invention is heretofore not known and is a novel process.

The present invention has been achieved based on novel knowledge that a triallylamine which is relatively easily available is used as a raw material and as shown in the following formulae (1) and (2), two allyl groups out of three allyl groups in the molecule are combined as propyl radicals during the electrolytic fluorination, thereby cyclizing and isomerizing.

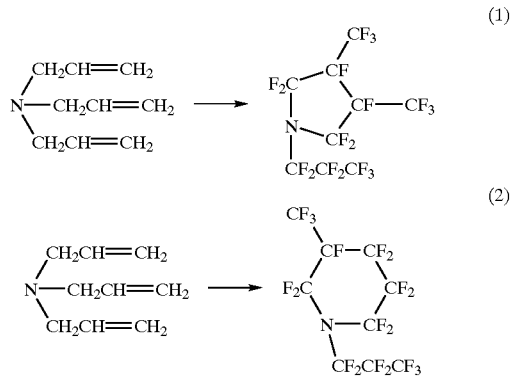

The embodiment of the present invention (I) is a process for producing cyclic amines, namely, cis-perfluoro-1-propyl-3,4-dimethylpyrrolidine (hereinafter referred to as "cis-PFPDMP"), trans-perfluoro-1-propyl-3,4-dimethylpyrrolidine (hereinafter referred to as "trans-PFPDMP") and perfluoro-1-propyl-3-methylpiperidine (hereinafter referred to as "PFPMP"), where the cyclic amines are produced by electrolytically fluorinating a triallylamine in an anhydrous liquid hydrogen fluoride. For this electrolytic fluorination reaction, a known electrolytic method heretofore commonly used in the electrolytic fluorination reaction, such as Simons type electrolytic cell, can be used.

This reaction is performed in an anhydrous liquid hydrogen fluoride and the concentration of the raw material triallylamine in the anhydrous liquid hydrogen fluoride can be selected from the range of 1 to 20% by mass, preferably from 5 to 10% by mass. If the triallylamine concentration exceeds 20% by mass, the yield is liable to decrease, whereas if it is less than 1% by mass, the reaction is liable to proceed slowly and this is not preferred.

The current density can be selected from the range of 0.1 to 10 A/dm$^2$, preferably from 2 to 4 A/dm$^2$. If the current density is too high, the electrolytic power excessively increases and side reactions are disadvantageously liable to take place.

The electrolytic temperature can be selected from the range of −20 to 50° C., preferably −10 to 20° C. If the reaction temperature is too low, the electrolytic voltage is liable to excessively increase, whereas if it is too high, hydrogen fluoride is readily volatilized and this is not preferred.

The electrolysis reaction can be usually performed under an atmospheric pressure but if desired, may be performed under pressure. In the case where the reaction is performed under pressure, the boiling point of hydrogen fluoride elevates and cooling of the reaction system can be advantageously mitigated.

In order to perform the electrolytic fluorination with good efficiency and improve the yield of the objective product, the electrolytic solution is preferably stirred and mixed during the reaction and for this purpose, means such as mechanical forced stirring or stirring by introduction of an inert gas may be used.

The thus-obtained perfluorocyclicamine contains, in addition to the objective product, low molecular substances having a low boiling point produced due to the cleavage during the fluorination or polymer substances produced due to the recombination. The high boiling materials including the objective product have a specific gravity higher than that of hydrogen fluoride and mostly remain on the inner bottom of the electrolytic cell. This deposit does not dissolve in the liquid hydrogen fluoride but is separated to form two layers. Therefore, the lower layer can be separated and taken out after the completion of electrolysis.

The solution of the lower layer separated and discharged is washed by a known method using an aqueous caustic soda solution or the like and after neutralizing and removing the hydrogen fluoride, dried to obtain a crude product. From this crude product, at least three kinds of perfluorocyclicamine isomers can be finally isolated by an isolation method using fractional gas chromatography or distillation, preferably precision distillation. By performing the structural analysis, each component can be confirmed to have a structure so that the raw material triallylamine is cyclized and thereby isomerized, as described above, to convert into a perfluorocyclicamine, namely, cis-PFPDMP, trans-PFPDMP and PFPMP. Then, this mixture of components can be separated into respective components by a precision distillation through increased plates or a method described later.

The embodiment of the present invention (II) is perfluoro-1-propyl-3,4-dimethylpyrrolidine (PFPDMP) and can be obtained by the production process of the present invention (I). This compound is a novel compound and is represented by formula (1):

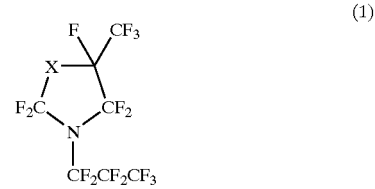

where —X— is —CF(CF$_3$)—. This compound has stereoisomers and includes cis-3,4-trifluoromethyl form (cis-PFPDMP) and trans-3,4-trifluoromethyl form (trans-PFPDMP).

The embodiment of the present invention (III) is a process for producing a constant boiling composition comprising cis-perfluoro-1-propyl-3,4-dimethylpyrrolidine (cis-PFPDMP), trans-perfluoro-1-propyl-3,4-dimethylpyrrolidine (trans-PFPDMP), perfluoro-1-propyl-3-methylpiperidine (PFPMP) and perfluorotripropylamine (PFTPA) by the electrolytic fluorination reaction of a triallylamine.

The conditions for the electrolytic fluorination may be the same as the conditions described above with respect to the production of perfluorocyclicamine. The discharged solution of the lower layer obtained after the electrolysis reaction is washed by a known method using an aqueous caustic soda solution or the like and after neutralizing and removing the hydrogen fluoride, dried to obtain a crude product. The thus-obtained crude product contains PFTPA in addition to the above-described cis-PFPDMP, trans-PFPDMP and PFPMP. PFTPA is a resultant from the fluorination and conversion of a part of the raw material triallylamine into PFTPA while not allowing the allyl groups to combine to form a ring. According to the production process of the present invention, a mixed composition mainly comprising four kinds of perfluoro-tertiary amines (including cyclic amine) can be obtained.

These four kinds of perfluoro-tertiary amines contained in this mixed composition have similar boiling points and, in general, separation into respective single components is difficult in industry. Therefore, in the embodiment of the present invention (IV), the mixed composition mainly comprising the above-described four kinds of perfluoro-tertiary amines is collected as an intermediate fraction, for example, by a method of cutting unnecessary low boiling and high boiling portions through simple and convenient batch distillation, and the mixture is used as it is. The four kinds of perfluoro-tertiary amines are similar in boiling point and therefore, need not be particularly separated into single components. By this process, a mixed composition having a purity of 99% or more (GC area) in terms of the purity of four components can be obtained. The purity is not particularly limited. The impurities contained other than those main components are fundamentally perfluoro-tertiary amines having a similar cyclic structure and have the same properties. Therefore, even if these are intermingled in slight amounts, no problem arises. As long as at least the main components are contained in a concentration of 95% or more, the effect of the present invention can be attained. The conditions for the GC analysis may be general conditions used in the analysis of fluorine compounds.

When the boiling point of the mixed composition obtained by the above-described process is examined while variously changing the composition, the boiling point is scarcely changed depending on the composition and the mixed composition behaves as a constant boiling composition of 127 to 129° C. Accordingly, with respect to the boiling point of the mixed composition, the compositional ratio of four components is not particularly limited. In a preferred embodiment of the mixed composition of the present invention (IV), the freezing point is −100° C. or less and the compositional ratio of PFTPA is 55% or less. The compositional ratio of PFTPA can be determined from the GC area percentage.

The constant boiling composition of the present invention (IV) is not limited to the mixed composition obtained by the above-described production process but may be a composition prepared, for example, by mixing cis-PFPDMP, trans-PFPDMP, PFPMP and PFTPA which are separately isolated.

In either case, a constant boiling composition in the vicinity of 128° C., that is, an azeotrope-like mixture is fundamentally formed. Since the compositions of the gas phase and the liquid phase are almost the same at the boiling point, the change in the composition accompanying the volatilization during the use can be neglected and the physical properties are mostly free of fear for changes. Thus, the composition is very useful in practice.

le;.5qThe constant boiling composition of the present invention (IV), which contains perfluorocyclicamines and PFTPA and has a freezing point of about −100° C. or less and a boiling point of 127 to 129° C., exhibits in any case a dielectric breakdown voltage of 45 kV or more and a volume resistivity on the order of $10^{15}$ to $10^{16}$. In addition, the composition is comparable to conventional heat mediums comprising PFCs and has more excellent characteristics than HFEs. The embodiment of the present invention (V) is a use of the constant boiling composition of the present invention (IV) as an electrical insulator. This electrical insulator can be used not only in the field of manufacture of semiconductors but also as an alternative of usual insulating oils by sealing it in a transformer, an electric power source breaker, a capacitor or the like.

The constant boiling composition of the present invention, which contains perfluorocyclicamines and PFTPA and has a freezing point of about −100° C. or less and a boiling point of 127 to 129° C., maintains the liquid phase in the temperature range during use of −70 to 100° C., for example, under an atmospheric pressure. Accordingly, the embodiment of the present invention (VI) is a use of the constant boiling composition of the present invention (IV) as a heat medium. The role of this heat medium is not limited only to circulate by itself through a heat transfer path and to indirectly heat or cool a material to which the heat is transmitted, but also includes directly contacting a material to which the heat is transmitted and heating or cooling the material. Furthermore, the temperature range during use is not limited to the range from −70 to 100° C., and the heat medium may be used under higher temperature conditions by completely closing the system and maintaining the liquid state under pressure of atmospheric pressure or more.

EXAMPLES

The present invention is described in greater detail below by referring to the Examples and Comparative Examples, however, the present invention should not be construed as being limited thereto. Unless indicated otherwise herein, all parts, percents, ratios and the like are by weight.

Example 1

A carbon steel-made Simons type electrolytic cell having an internal volume of 2 L with an internal cooling coil and an external cooling jacket was used. The electrode was formed by alternately arranging two sheets of anodes and three sheets of cathodes at an anode-cathode distance of 2 mm. The anodes and the cathodes each was made of nickel plate having a thickness of about 1.5 mm and the electrode had an effective anode area of 3.15 dm$^2$. The cover of the electrolytic cell was connected with a reflux capacitor communicating with a sodium fluoride tower and the cell was always cooled to −50 to −40° C. Also, in the electrolytic cell, a supply port for liquid hydrogen fluoride and a temperature detecting sensor were provided. The bottom part of the electrolytic cell was connected with an extraction port and subsequently thereto, a liquid-liquid separator with an inspection hole.

About 1,270 g of anhydrous liquid hydrogen fluoride was introduced into the electrolytic cell and preliminarily electrolyzed, and thereby purified. In this anhydrous liquid hydrogen fluoride, about 115 g of raw material triallylamine having a purity of 99% was dissolved to a triallylamine concentration of about 8% by mass. Through this electrolytic solution, a constant current of 9.5 A was passed at a current density of 3 A/dm$^2$ for 117 hours under an atmospheric pressure to electrolyze the electrolytic solution. During this, the electrolytic voltage was from 5.9 to 6.7 V. The total quantity of current passed was 1,111 A·hr.

The temperature of the electrolytic solution was kept at 15 to 20° C. by means of the reflux condenser and water cooling from the inner and outer sides. The hydrogen fluoride gas accompanying the low boiling gas generated as a by-product was prevented from flowing out and the hydrogen fluoride partly flown out was removed through the sodium fluoride tower. During the electrolysis, the anhydrous liquid hydrogen fluoride needed was periodically supplied from the supply port.

After the completion of electrolysis, the high boiling liquid was extracted from the bottom of the electrolytic cell and the anhydrous liquid hydrogen fluoride was separated and removed through the liquid-liquid separator. The obtained high boiling liquid was neutralized by a mixed solution of potassium hydroxide and ethanol, washed with water and then dried over silica gel to obtain 381.4 g of a crude product. This crude product was fractionated through a packed column system batch distillation unit and impurities of low boiling substance and high boiling substance were removed to obtain 142 g of the objective substance in a yield of 35% (based on the triallylamine charged). The low boiling substance removed was mainly a perfluoro-compound having from 4 to 8 carbon atoms and the high boiling substance was mainly a triallylamine partially fluorine compound having 9 or more carbon atoms or a high polymer.

The thus-obtained objective substance was analyzed by gas chromatography (carrier gas: He, column: fused silica, 30 m). As a result, it was confirmed that the objective substance was a mixed composition comprising four kinds of main components and the total of respective component compositions (GC area standard) was 99% or more.

This mixed composition was introduced into a precision distillation unit (theoretical plate number: 200) and about 5 g of the compound having a boiling point of about 127° C. was first isolated. The structure of this compound was confirmed by measurements such as $^{19}$F-NMR and GC-MS and the compound obtained was found to be trans-perfluoro-1-propyl-3,4-dimethylpyrrolidine (trans-PFPDMP) (molecular formula: C$_9$F$_{19}$N). The measurement data of $^{19}$F-NMR are shown in Table 1. The measurement of $^{19}$F-NMR spectrum was performed at an operating frequency of 188.3 MHz and trifluoroacetic acid was used as the external standard substance. The GC-MS measurement data and the elemental analysis data are shown below.

GC-MS measurement data: $C_9F_{18}N^+ 464$ (M$^+$)

Elemental analysis data ($C_9F_{19}N$)

Found (%): C, 22.14; F, 74.90.

Calculated (%): C, 22.36; F, 74.74.

The precision distillation was continued under the same conditions and about 10 g of the compound having a boiling point of about 127.5° C. was subsequently isolated. The structure was confirmed in the same manner, and as a result, the compound was found to be cis-perfluoro-1-propyl-3,4-dimethylpyrrolidine (cis-PFPDMP) (molecular formula: $C_9F_{19}N$). The $^{19}$F-NMR data are shown in Table 1. The GC-MS measurement data and the elemental analysis data are shown below. The data obtained were the same as those of the trans-isomer.

GC-MS measurement data: $C_9F_{18}N^+ 464$ (M$^+$)

Elemental analysis data ($C_9F_{19}N$)

Found (%): C, 22.18; F, 74.83.

Calculated (%): C, 22.36; F, 74.74.

The still residue solution after the distillation was introduced into a fractional gas chromatograph (liquid phase: 20% squalane, support: chromatoron N-A (from 0.2 to 0.25 mm), length: 8 m, diameter: 9 m) and by repeating the fractionation, about 8 g of the compound having a boiling point of about 128.5° C. was isolated. The structure of this compound was confirmed in the same manner as above, and as a result, the compound was found to be perfluoro-1-propyl-3-methylpiperidine (PFPMP) (molecular formula: $C_9F_{19}N$). The $^{19}$F-NMR data are shown in Table 1. The GC-MS measurement data and the elemental analysis data are shown below.

GC-MS measurement data: $C_9F_{18}N^+ 464$ (M$^+$)

Elemental analysis data ($C_9F_{19}N$)

Found (%): C, 22.44; F, 74.80.

Calculated (%): C, 22.36; F, 74.74.

At the same time, about 10 g of the compound having a boiling point of about 128° C. was isolated and analyzed and this compound was confirmed to be perfluorotripropylamine (PFTPA) by comparing the holding time in the gas chromatograph, GC-MS data and the like with those of a known compound.

TABLE 1

| Compound | Chemical Shift (ppm) | Coupling Constant (Hz) |
|---|---|---|
| trans-PFPDMP | 4.9($C^1F_3$)<br>50.4($C^2F_2$)<br>13.6($C^3F^a$)<br>21.0($C^3F^e$)<br>2.0($C^4F^a$, $C^7F^a$)<br>13.6($C^4F^e$, $C^7F^e$)<br>105.3($C^5F$, $C^6F$)<br>3.8($C^8F_3$, $C^9F_3$) | 245<br>188 |
| cis-PFPDMP | 4.4($C^1F_3$)<br>49.8($C^2F_2$)<br>16.2($C^3F_2$)<br>3.2($C^4F^a$, $C^7F^a$)<br>7.4($C^4F^e$, $C^7F^e$)<br>104.8($C^5F$, $C^6F$)<br>−4.0($C^8F_3$, $C^9F_3$) | 178 |
| PFPMP | 4.9($C^1F_3$)<br>49.6($C^2F_2$)<br>12.0($C^3F_2$)<br>1.8($C^4F^a$)<br>26.0($C^4F^e$)<br>45.2($C^5F^a$)<br>55.9($C^5F^e$)<br>45.9($C^6F^a$)<br>63.5($C^6F^e$)<br>105.0($C^7F$)<br>−5.7($C^8F^a$)<br>15.5($C^8F^e$)<br>−6.7($C^9F_3$) | 227<br>291<br>273<br>209 |

Respective components of the initially obtained mixed composition comprising four kinds of components were separated by the above-described method, and from the analysis results on the rough composition (area %) by gas chromatography, each component was found to have the name and the compositional ratio shown in Table 2. Identification of impurities other than those main components was difficult because they were each present in a trace amount, but it is considered that the impurities are mainly cyclic isomers having 9 carbon atoms.

TABLE 2

| Compound | Compositional Ratio |
|---|---|
| trans-Perfluoro-1-propyl-3,4-dimethylpyrrolidine (trans-PFPDMP) | 13% |
| cis-Perfluoro-1-propyl-3,4-dimethylpyrrolidine (cis-PFPDMP) | 32% |

TABLE 2-continued

| Compound | Compositional Ratio |
|---|---|
| Perfluoro-1-propyl-3-methylpiperidine (PFPMP) | 24% |
| Perfluorotripropylamine (PFTPA) | 30% |

Example 2

Electrolysis was performed using the same electrolytic cell in the same manner as in Example 1, except for changing the triallylamine concentration in the electrolytic solution and the current density. The yield of each mixed composition obtained was examined. The results are shown in Table 3.

TABLE 3

| Triallylamine Concentration in Electrolytic Solution [% by mass] | Current Density [A/dm$^2$] | Yield of Mixed Composition [%] |
|---|---|---|
| 3 to 5 | 1 to 2 | 25 |
| 5 to 10 | 1 to 2 | 25 |
| 5 to 10 | 2 to 4 | 35 |
| 5 to 10 | 4 to 6 | 20 |
| 15 to 20 | 4 to 6 | 15 |

It is seen from the results shown in Table 3 that the yield is relatively high under the conditions such that the triallylamine concentration is from 5 to 10% by mass and the current density is from 2 to 4 A/dm$^2$.

Example 3

A triallylamine was electrolytically fluorinated under the same conditions as in Example 1 and the purification treatment was performed through the same procedure to obtain a mixed composition having a purity of 99%. This composition was confirmed by gas chromatography and found to be almost the same as the composition of Example 1.

The mixed composition obtained and perfluoropropylamine (PFTPA) separately purchased were mixed in various compositional ratios to prepare samples each in 50 ml. The samples each was charged into a 100 ml-volume flask with the top being opened to air and equipped with a refluxing unit and while water cooling the refluxing unit at the top, the lower part thereof was slowly heated using a Bunsen burner to keep the inside of the system in the refluxing state, and the temperature of the boiling liquid was accurately measured using a platinum resistance thermometer. The boiling data under an atmospheric pressure are shown in Table 4.

TABLE 4

| PFTPA Concentration in Mixed Composition [%] | Boiling Point [° C.] (1,010 hPa) |
|---|---|
| 30 (original) | 127.7 |
| 40 | 127.8 |
| 55 | 127.9 |
| 70 | 127.9 |

It is seen from the measurement results shown in Table 4 that the change in the boiling point is at most 0.2° C. and the mixed composition is substantially a constant boiling composition over a wide compositional range under an atmospheric pressure.

Example 4

A mixed composition obtained in the same manner as in Example 1 and perfluoro-1-propyl-3-methylpiperidine (PFPMP) separately isolated and obtained were mixed in various compositional ratios to prepare samples each in 50 ml. The boiling points were measure in the same manner as in Example 3 and the results are shown in Table 5.

TABLE 5

| PFPMP Concentration in Mixed Composition [%] | Boiling Point [° C.] (1,015 hPa) |
|---|---|
| 24 (original) | 127.7 |
| 40 | 127.9 |
| 50 | 128 |
| 60 | 128 |

It is seen from the measurement results shown in Table 5 that the change in the boiling point is at most 0.3° C. and the mixed composition is substantially a constant boiling composition.

Example 5

Similar to Examples 3 and 4, a mixed composition obtained in the same manner as in Example 1 and a mixture of trans-perfluoro-1-propyl-3,4-dimethylpyrrolidine (trans-PFPDMP) and cis-perfluoro-1-propyl-3,4-dimethylpyrrolidine (cis-PFPDMP) separately isolated and obtained and in a compositional ratio of about 29%/71% were mixed in various compositional ratios to prepare samples each in 50 ml. The boiling point of each solution was measured in the same manner and the results thereof are shown in Table 6.

TABLE 6

| PFPDMP Concentration in Mixed Composition [%] | | Boiling Point [° C.] |
|---|---|---|
| trans | cis | (1,008 hPa) |
| 13 | 32 | 127.7 |
| 17 | 43 | 127.6 |
| 20 | 50 | 127.6 |
| 23 | 57 | 127.5 |

It is seen from the measurement results shown in Table 6 that the change in the boiling point is at most 0.2° C. and the mixed composition is substantially a constant boiling composition.

Example 6

A triallylamine was electrolytically fluorinated under the same conditions as in Example 1 and the purification treatment was performed through the same procedure to obtain a mixed composition having a purity of 99%. The composition was confirmed by gas chromatography and found to be almost the same as the composition of Example 1.

100 ml of this sample was charged into a 200 ml-volume distillation flask and while slowly heating the lower part using a Bunsen burner, the sample was distilled by the single distillation. The top of the flask was branched diagonally toward the lower direction and connected to a receiver with a scale through a water-cooled condenser. The inside of the system was kept at an atmospheric pressure and the boiling point and the cumulative distillation amount (volume) were recorded with the passage of time. The temperature was accurately measured using a platinum resistance thermometer. The boiling point data at each distillation ration (a ratio of cumulative volume of sample distilled to the volume of sample charged) are shown in Table 7.

TABLE 7

| Distillation Ratio [%] | Boiling Point [° C.] (1,004 hPa) |
| --- | --- |
| 20 | 127.8 |
| 40 | 127.9 |
| 60 | 128.0 |
| 80 | 128.1 |

The change in the boiling point is about 0.3° C. during the single distillation under an atmospheric pressure and from this, the mixed composition obtained is known to be substantially a constant boiling composition (that is, an azeotrope-like composition).

Example 7

A triallylamine was electrolytically fluorinated under the same conditions as in Example 1 and the purification treatment was performed through the same procedure to obtain a mixed composition having a purity of 99%. The composition was confirmed by gas chromatography and found to be almost the same as the composition of Example 1. Thereafter, the precision distillation and the like were repeated to isolate respective samples of cis-PFPDMP, trans-PFPDMP and PFPMP.

The dielectric breakdown voltage was measured under the conditions of 25° C., an anode-cathode distance of 2.5 mm and a pressure rising rate of 3 KV/sec. The volume resistivity was measured under the conditions of 25° C., an anode-cathode distance of 1 mm and an electrode area of 100 cm$^2$. The data obtained are shown in Table 8. The evaluation results of the electrical insulating property are shown together in Table 8. In the evaluation, ◯ denotes excellent electrical insulating property and X denotes poor electrical insulating property.

TABLE 8

| Sample | Dielectric Breakdown Voltage [kV] | Volume Resistivity [Ωcm] | Electrical Insulating Property |
| --- | --- | --- | --- |
| Mixed composition (original) | 45 | 9 × 10$^{15}$ | ◯ |
| cis-PFPDMP | 45 | >1 × 10$^{16}$ | ◯ |
| trans-PFPDMP | 45 | >1 × 10$^{16}$ | ◯ |
| PFPMP | 46 | >1 × 10$^{16}$ | ◯ |

Comparative Example 1

Under the same conditions as in Example 7, PFCs having 6 or 8 carbon atoms and $C_4F_9OC_2H_5$ which is HFEs having 6 carbon atoms were measured on the dielectric breakdown voltage and the volume resistivity. The data are shown in Table 9. Also, the electrical insulating property was evaluated according to the same criteria.

TABLE 9

| Sample | Dielectric Breakdown Voltage [kV] | Volume Resistivity [Ωcm] | Electrical Insulating Property |
| --- | --- | --- | --- |
| PFCs (C6) | 39 | 1 × 10$^{15}$ | ◯ |
| PFCs (C8) | 40 | 8 × 10$^{15}$ | ◯ |
| HFEs (C6) | 20 | 4 × 10$^8$ | X |

The perfluorocyclicamines of the present invention and the mixed composition containing these perfluorocyclicamines have electrical insulating property equal to or higher than that of conventional PFCs and HFEs. Therefore, they can be used as an electrical insulator for various uses.

Example 8

A triallylamine was electrolytically fluorinated under the same conditions as in Example 1 and the purification treatment was performed through the same procedure to obtain a mixed composition having a purity of 99%. The composition was confirmed by gas chromatography and found to be almost the same as the composition of Example 1.

Thereafter, precision distillation and the like were repeated to isolate samples of cis-PFPDMP, trans-PFPDMP and PFPMP. Also, PFTPA was separately prepared. These components were appropriately mixed to prepare five kinds in total of samples each in 50 ml.

The behavior at low temperatures was first confirmed. A vacuum Dewar vessel under thorough cold insulation was designed so that a stainless steel-made cylindrical container having a content volume of 100 ml with a transparent acryl-made cover was fixed therein. The cover had a propeller blade driven by an external motor by inserting it at the center part down to the vicinity of the bottom. Also, a slight amount of dry nitrogen gas was always flown through the inside of the system to prevent the effect of icing due to intermixing of moisture from the outside air.

50 ml of the sample was charged into the stainless steel-made container and placed in the Dewar vessel. The inside temperatures of both containers were recorded by a thermocouple thermometer for low temperatures. Using ethanol/dry ice as a freezing mixture, the sample was cooled to the vicinity of −70° C. and the sample temperature was stabilized. In order to reach a still lower temperature, a liquid nitrogen gas was supplied in place of the ethanol/dry ice through a cold insulation piping and by controlling the amount thereof supplied, the sample temperature was stabilized in the vicinity of −100° C.

Next, the behavior at high temperatures was confirmed. Using a silicone oil bath employing a temperature controlling system by an electrical heater in place of the vacuum Dewar vessel, the sample was heated to the vicinity of 100° C. and the sample temperature was stabilized. Each sample was observed to examine the state of the liquid phase, the degree of fluidity and the degree of volatility at each temperature. The results are shown in Table 10. The results were evaluated according to the following criteria. Each sample was separately measured on the boiling point and the freezing point and the results are shown together in Table 10.

State of Liquid Phase:
 ◯: transparent liquid phase was held, Δ: the phase became turbid,
 X: concreted.

Fluidity:
 ◯: excellent, Δ: flowable, X: not flowable

Volatility:
 ◯: low, Δ: high, X: extremely high (boiled)

TABLE 10

| Compound | Freezing Point [° C.] | Boiling Point [° C.] | Set Temperature | | | | |
|---|---|---|---|---|---|---|---|
| | | | −100° C. | | −70° C. | | 100° C. |
| | | | Liquid Phase | Fluidity | Liquid Phase | Fluidity | Volatility |
| Mixed Composition (original) | −125 | 127.7 | ○ | Δ | ○ | ○ | ○ |
| Mixed Composition (55% PFTPA) | −100 | 127.9 | Δ | X | ○ | Δ | ○ |
| Mixture of trans/cis PFPDMP (29%/71%) | −150 | 127.2 | ○ | Δ | ○ | ○ | ○ |
| cis-PFPDMP | −150 | 127.5 | ○ | Δ | ○ | ○ | ○ |
| PFPMP | −140 | 128.5 | ○ | Δ | ○ | ○ | ○ |

Comparative Example 2

Through the same procedure as in Example 8, PFCs having 6 or 8 carbon atoms and $C_4F_9OC_2H_5$, which is HFEs having 6 carbon atoms, were observed to examine the state of liquid phase, the degree of fluidity and the degree of volatility at each temperature. The results thereof are shown in Table 11.

TABLE 11

| Compound | Freezing Point [° C.] | Boiling Point [° C.] | Set Temperature | | | | |
|---|---|---|---|---|---|---|---|
| | | | −100° C. | | −70° C. | | 100° C. |
| | | | Liquid Phase | Fluidity | Liquid Phase | Fluidity | Volatility |
| PFCs (C6) | −92 | 56 | X | X | ○ | ○ | X |
| PFCs (C8) | −88 | 100 | X | X | ○ | Δ | X |
| HFEs (C6) | −135 | 77 | ○ | ○ | ○ | ○ | X |

The perfluorocyclicamines of the present invention and the mixed composition containing these perfulorocyclicamines hold the liquid phase over a wide temperature range as compared with conventional PFCs and HFEs, and therefore, can be used as a heat medium.

According to the present invention, novel perfluorocyclicamines can be obtained by electrolytically fluorinating a triallylamine which is easily available. Particularly, a mixed composition thereof is a constant boiling composition and reduced in the change of composition during use. Therefore, this compound is practically useful. Furthermore, the perfluorocyclicamines of the present invention have a relatively high boiling point and a fairly low freezing point and therefore, not only can hold the liquid phase over a wide temperature range but also exhibit excellent electrical insulating property. Accordingly, the perfluorocyclicamines can be used as an electrical insulator or a heat medium and can replace conventional PFCs. Furthermore, by virtue of the relatively high boiling point, these substances can contribute to the reduction in the discharge of warming gases and also since chlorine atom is not contained therein, can be free from fear of rupturing the ozone layer.

While the invention has been described in detail and with reference to specific embodiments thereof, it will be apparent to one skilled in the art that various changes and modifications can be made therein without departing from the spirit and scope thereof.

The invention claimed is:

1. A process for producing a perfluorocyclicamine, comprising electrolytically fluorinating a triallylamine in anhydrous liquid hydrogen fluoride to produce a perfluorocyclicamine represented by the following formula (I):

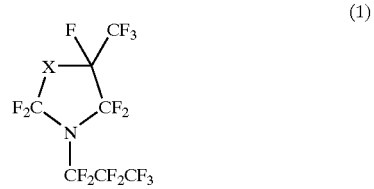

(1)

wherein —X— represents —CF(CF$_3$)— or —CF$_2$CF$_2$—.

2. The process for producing a perfluorocyclicamine as claimed in claim 1, wherein the anhydrous liquid hydrogen fluoride contains a triallylamine in an amount from 1 to 20% by mass.

3. The process for producing a perfluorocyclicamine as claimed in claim 1, which comprises electrolytically fluorinating at a current density in a range of from 0.1 to 10 A/dm$^2$.

4. The process for producing a perfluorocyclicamine as claimed in claim 2, which comprises electrolytically fluorinating at a current density in a range of from 0.1 to 10 A/dm$^2$.

* * * * *